United States Patent Office 3,480,666
Patented Nov. 25, 1969

3,480,666
PRODUCTION OF EPOXIDE-TAURINE SALT CONDENSATION PRODUCTS
Louie S. Bitar and Henry R. Grane, Springfield, Pa., assignors to Atlantic Richfield Company, Philadelphia, Pa., a corporation of Pennsylvania
No Drawing. Filed Nov. 21, 1967, Ser. No. 684,612
Int. Cl. C07c 143/14
U.S. Cl. 260—513        10 Claims

ABSTRACT OF THE DISCLOSURE

Method of producing high yields of epoxide-taurine salt condensation products by effecting the condensation of the epoxide with an aqueous solution of the taurine salt and the minimum amount of a $C_1$ to $C_4$ alcohol to give a single phase solution at the condensation reaction temperature.

BACKGROUND OF THE INVENTION

Field of the invention

This invention relates to a method for obtaining high yields of epoxide-taurine salt condensation products which comprises condensing a $C_4$ to $C_{18}$ epoxide with a taurine salt in aqueous solution with the minimum amount of a $C_1$ to $C_4$ alcohol to give a single phase solution consisting of water, alcohol and the reactants at the condensation reaction temperature.

PRIOR ART

Epoxide-taurine salt condensation products have been found to be useful in detergent compositions either as a replacement for the "active" compound such as an alkyl aryl sulfonate in built detergent compositions or as a replacement for a portion or all of the polyphosphates in built detergent compositions. Certain of these condensation products are shown in U.S. Patent No. 3,084,187 (1963) to Gaertner.

The production of epoxides including the epoxyalkanes having 4 to 18 carbon atoms is shown in Belgian Patent No. 674,076 dated June 20, 1966. This patent describes the epoxidation of olefins utilizing a molybdenum-containing catalyst and an organic hydroperoxide as the oxidizing agent. It sets forth the proportions of reactants, the various types of reactants and all of the reaction conditions utilized in the epoxidation of olefinic compounds including the $C_4$ to $C_{18}$ aliphatic acylic olefins. The olefins in this range are well known compounds, the lower members being contained in various petroleum fractions. The higher members can be produced by cracking wax fractions to produce mainly alpha-olefins which when epoxidized give the 1,2-epoxyalkanes. The higher internal olefins are produced conveniently by monochlorinating the paraffin of the desired carbon number range and dehydrochlorinating the monochloroparaffin to obtain the corresponding internal olefins.

SUMMARY OF THE INVENTION

In accordance with this invention it has been found that the yield of condensation product of an epoxide with a taurine salt can be maximized if the condensation reaction is carried out in water-$C_1$ to $C_4$ alcohol solution wherein the alcohol is present in the minimum but sufficient amount to provide a single phase reaction mixture at the condensation reaction temperature.

It is an object of this invention therefore to provide a method for producing high yields of epoxide-taurine salt condensation products.

It is another object of this invention to provide a method for producing high yields of epoxide-taurine salt condensation products by effecting the reaction in a single phase at the condensation reaction temperature.

It is a further object of this invention to provide a method for producing high yields of epoxide-taurine salt condensation products by effecting the reaction in a water-alcohol solvent mixture wherein the alcohol is present only in an amount sufficient to give a single phase at the condensation reaction temperature.

Other objects of this invention will be apparent to those skilled in the art from the following description and the claims.

DESCRIPTION OF THE PREFERRED EMBODIMENTS

As has been stated this invention is concerned with the maximization of yields of the condensation products of $C_4$ to $C_{18}$ epoxides with a taurine salt. The condensation products which it is preferred to prepare in accordance with this invention have the formula

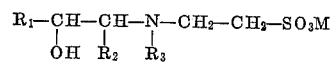

where $R_1$ is an alkyl radical having from 2 to 16 carbon atoms, $R_2$ is hydrogen or an alkyl radical having from 1 to 14 carbon atoms and the sum of the carbon atoms in $R_1$ plus $R_2$ ranges from 2 to 16, M is ammonium or an alkali metal ion and $R_3$ is a methyl radical or a beta-hydroxy-alkyl radical having the formula

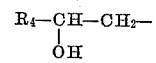

wherein $R_4$ is a methyl radical, an ethyl radical or a propyl radical.

These compounds are produced by the condensation of an epoxide with the N-methyltaurine salt or by condensing the taurine salt with the $C_3$ to $C_5$ epoxide and thereafter condensing the $C_3$–$C_5$ epoxide-taurine salt condensation product with an epoxide having from 4 to 18 carbon atoms.

If it is desired to produce the epoxide-N-methyltaurine salt the $C_4$ to $C_{18}$ epoxide is condensed with the N-methyltaurine salt (generally as the commercial 65 per cent aqueous solution of the sodium salt) in accordance with the method of this invention to be described in detail hereinafter. If the $C_4$ to $C_{18}$ olefin is terminally unsaturated there is produced the compound having the formula

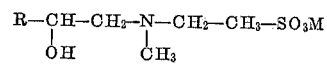

where R is a $C_2$ to $C_{16}$ alkyl radical and M is ammonium or alkali metal ion.

If the epoxide is produced from a $C_4$–$C_{18}$ olefin having an internal olefinic bond, the epoxide has the formula

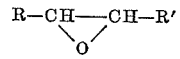

wherein R and R' are alkyl radicals and the sum of the carbon atoms in R plus R' ranges from 2 to 16 and the condensation with the N-methyltaurine salt produces a compound having the formula

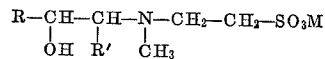

wherein M is ammonium or alkali metal ion.

The diepoxide taurine salt condensation products are produced by reacting the $C_3$ to $C_5$ epoxide with a taurine salt such as the sodium salt. If the epoxide is propylene oxide the condensation can be carried out in an aqueous solution only since both the taurine salt and the epoxide are water soluble. If the epoxide is a $C_4$ or $C_5$ compound then the method of this invention is advantageous (i.e. the use of an alcohol with the water) since these epoxides are only sparingly soluble in water. The N-beta-hydroxy $C_3$–$C_5$ alkyl taurine salt which is obtained is then condensed in accordance with the teachings of this invention with an epoxyalkane having from 4 to 18 carbon atoms in the molecule. The final condensation product consisting of the N-beta-hydroxy $C_3$–$C_5$ alkyl-N-beta-hydroxy $C_4$–$C_{18}$ alkyl taurine salt has the formula

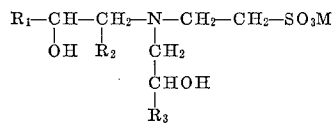

where $R_1$ is an alkyl radical having from 2 to 16 carbon atoms, $R_2$ is hydrogen or an alkyl radical having from 1 to 14 carbon atoms, the sum of the carbon atoms in $R_1$ plus $R_2$ ranges from 2 to 16, $R_3$ is an alkyl radical ranging from 1 to 3 carbon atoms, and M is ammonium or an alkali metal ion.

Although approximately equal molar quantities of the epoxide and taurine salt can be used it is preferred to use a molar excess of the taurine salt. Taurine salt to epoxide mole ratios of from 1.1:1 to 1.7:1 are preferred and it has been found that there is a yield advantage in using the higher ratios for example 1.4:1.

As has been stated the taurine salt and N-methyltaurine salts are water soluble. They are sold commercially as aqueous solutions, hence it is desirable to carry out the condensation with the epoxide using the aqueous solution of the taurine or N-methyltaurine salt. The $C_4$ and $C_5$ epoxides are only sparingly soluble in water and the $C_6$ and higher epoxides are substantially insoluble in water. Accordingly, in the absence of any other solvent where the epoxide in the $C_4$ to $C_{18}$ range is admixed with the aqueous turine salt, a two-phase system results. When the condensation reaction is carried out with a two-phase system poor yields of the condensation product are obtained. When $C_1$ to $C_4$ alcohol is added to the system in an amount sufficient to produce a single phase (the epoxides being soluble in such alcohols and the alcohols being miscible with water) high yields of condensation product are obtained. This is the first critical feature of this invention, therefore, the condensation reaction must be carried out in a single phase system by the use of a $C_1$ to $C_4$ alcohol as the co-solvent along with the water.

It has been found additionally, and this is the second critical feature of this invention, that only the minimum amount of alcohol required to obtain a single phase at the condensation reaction temperature should be used to maximize the yield of condensation product. If an amount of alcohol larger than the minimum amount required to obtain a single phase system is used the yields obtained will be somewhat below the maximum obtainable. Although the first feature, i.e. the use of a single phase system shows the greatest improvement in yield when compared with a two-phase system the second feature is equally important and only by minimizing the alcohol content is it possible to obtain yields approaching theoretical.

The alcohols which are used in this invention are methyl alcohol, ethyl alcohol, n-propyl alcohol, isopropyl alcohol, the butyl alcohols including tertiary-butyl alcohol, the glycols such as ethylene glycol, propylene glycol and the polyols. The most preferred alcohols are methyl alcohol and ethyl alcohol.

The condensation reaction can be carried out at temperatures ranging from 25° C. to 200° C. or above. It is preferred, however, to use temperatures in the range of from about 70° C. to 130° C. Temperatures in the 25° C. to 70° C. range require rather long reaction times ranging from 2 to 12 hours in order to obtain about 80 weight percent conversion of the epoxide, the longer times being required for the lower temperatures. Excellent yields of condensation product based on the amount of epoxide converted are obtained under these conditions, however. Temperatures in the range of from 70° C. to about 130° C. require only from about 15 minutes to 2 hours to obtain an 80 percent conversion of the epoxide, while of a reaction time of about 1 hour at 110° C. is utilized the epoxide conversion will reach approximately 93 percent or higher. At temperatures in the range of from 130° C. to about 200° C. considerably shorter reaction times can be utilized, for example, the order of several minutes. At these temperatures, however, the conversion decreases primarily because at the higher temperatures undesirable side reactions occur. Thus, a maximum of 80 percent conversion is reached at 200° C. in about 35 minutes. Moreover, the yield of condensation product based on the epoxide converted decreases at the higher temperatures. Thus, in summary, although temperatures in the range of 25° C. to 200° C. can be used it is preferred to use temperatures in the range of 70° C. to 130° C. since these temperatures provide both high conversion of epoxide and high yield of condensation product. If reaction temperatures below the boiling point of the solvent reactant mixture are used, the reaction can be carried out under atmospheric pressure under reflux conditions, for example. If, however, the higher temperatures above the boiling point of the mixture are employed, superatmospheric pressures will be required to prevent loss of solvent and reactants.

The amount of alcohol required to obtain a single phase system depends upon the amounts and kinds of epoxide and taurine salts, the amount of water and the condensation reaction temperature employed. For example, at 25° C. if the epoxide is a mixture of $C_{15}$–$C_{17}$ 1,2-epoxyalkanes and the salt is N-methyltaurine sodium salt with the mole ratio of N-methyltaurine sodium salt to epoxides being 1.1:1 and the mixture is present on a weight basis of 11 grams mixed with 6 grams of water there will be required a minimum of 83 grams of methyl alcohol to product a single phase system at this temperature.

At 50° C. with the same N-methyltaurine sodium salt and $C_{15}$–$C_{17}$ 1,2-epoxyalkane mixture on a weight basis of 20 grams with 6 grams of water a minimum of 74 grams of methyl alcohol will be required to produce a single phase system. At 70° C. the same N-methyltaurine and epoxide mixture in the amount of 20 grams with 17 grams of water there will be required a minimum of 73 grams of methyl alcohol to produce a single phase system. At the same temperature (70° C.) and with the same reactants in an amount of 38 grams with 22 grams of water there will be required a minimum of 40 grams of methyl alcohol to produce a single phase system. At the same temperature (70° C.) with 80 grams of the same reactant mixture and 10 grams of water only 10 grams of methyl alcohol are required to give a single phase system. At 110° C. with 50 grams of the N-methyltaurine and $C_{15}$–$C_{17}$ 1,2-epoxyalkane mixture in 1.1:1 mole ratio and 26 grams of water there will be required a minimum of 24 grams of methyl alcohol to give a single phase system. In all cases, however, the minimum amount of methyl alcohol required to give a single phase can be determined simply by visual observation. A known mixture of water and taurine-epoxide reactants is prepared and methyl alcohol is added in increments to this mixture, which is held at the temperature at which the condensation reaction is to be carried out until a single phase is observed. Thus, the amount of methyl alcohol required to produce a single phase system can be determined simply by observation. Since as has been pointed out the amount of alcohol required will depend on the amount and type of taurine salt, the amount and molecular weight of epoxide, the amount of water and the reaction temperature, it is necessary to determine for each such mixture the quantity of alcohol required by the visual method which has been described. The critical features which are to be kept in mind, however, are a sufficient amount of alcohol should be utilized to produce a single phase system but that the amount of alcohol should be held to the minimum required. The examples which have been shown above show how the critical amount of alcohol varies with temperature and composition in typical systems.

The following examples are provided for the purpose of illustrating specific embodiments of the invention but these examples are not to be construed as limiting the invention solely thereto.

EXAMPLE I

A mixture of N-methyltaurine sodium salt and a mixture of $C_{15}$–$C_{17}$ 1,2-epoxyalkanes (average $C_{16}$) in a mole ratio of 1.1:1 taurine to epoxides were reacted for 60 minutes at 70° C. with the compositions and results shown in Table I.

TABLE I

| Run No. | Composition of Reactant-Solvent Mixture, Wt. percent | | | | Weight percent yield of condensation product [1] |
|---|---|---|---|---|---|
| | Reactants | $H_2O$ | $CH_3OH$ | Phase Region | |
| 1 | 64 | 16 | 20 | One layer | 91 |
| 2 | 55 | 27 | 18 | Two layers | 10 |
| 3 | 48 | 36 | 16 | do | 10 |

[1] Based on amount of epoxide converted.

EXAMPLE II

Identical runs were carried out as in Example I except that the reaction temperature was 25° C. and the reaction time was 12 hours. The compositions and results are shown in Table II.

TABLE II

| Run No. | Composition of Reactant-Solvent Mixture, Wt. percent | | | | Weight percent yield of condensation product [1] |
|---|---|---|---|---|---|
| | Reactants | $H_2O$ | $CH_3OH$ | Phase Region | |
| 4 | 11 | 6 | 83 | One layer | 96 |
| 5 | 22 | 16 | 62 | Two layers | 61 |

[1] Based on amount of epoxide converted.

EXAMPLE III

A third series of runs identical to Examples I and II except that a reaction temperature of 110° C. and a reaction time of 60 minutes was employed. The compositions and results are shown in Table III.

TABLE III

| Run No. | Composition of Reactant-Solvent Mixture, Wt. percent | | | | Weight percent yield of condensation product [1] |
|---|---|---|---|---|---|
| | Reactants | $H_2O$ | $CH_3OH$ | Phase Region | |
| 6 | 37 | 23 | 40 | One layer | 86 |
| 7 | 37 | 42 | 21 | Two layers | 59 |
| 8 | 42 | 58 | 0 | do | 10 |

[1] Based on amount of epoxide converted.

Examples I, II and III demonstrate the necessity for utilizing a single phase system to obtain high yields of the condensation product.

EXAMPLE IV

In addition to the necessity for operating within a single phase system in order to maximize the yield of condensation product it is necessary that a minimum amount of the alcohol be employed. In order to demonstrate this, three runs were carried out utilizing the same N-methyltaurine sodium salt and $C_{15}$–$C_{17}$ 1,2-epoxyalkane mixture employed in Examples I, II and III. A reaction temperature of 110° C. was employed and the yield of the condensation product was determined in each run after a 20 minute reaction time. The compositions and results are shown in Table IV.

TABLE IV

| Run No. | Composition of Reactant-Solvent Mixture, Wt. percent | | | | Weight percent yield of condensation product [1] |
|---|---|---|---|---|---|
| | Reactants | $H_2O$ | $CH_3OH$ | Phase Region | |
| 9 | 50 | 32 | 18 | Two layers | 58 |
| 10 | 37 | 23 | 40 | One layer | 80 |
| 11 | 22 | 15 | 63 | do | 63 |

[1] Based on amount of epoxide converted.

It will be seen from these results that if the minimum amount of alcohol is employed, the yields are maximized. It will be understood, of course, that in these runs all yields would have been increased with longer reaction times, however, for purposes of illustrating the principle a 20 minute reaction time was utilized. The same yield differences are obtained when longer reaction times are utilized.

EXAMPLE V

In order to show that it is somewhat advantageous to use an excess of the taurine salt, two runs were prepared wherein the mole ratio of the N-methyltaurine sodium salt to $C_{15}$–$C_{17}$ 1,2-epoxy alkane mixture was varied. In each run the same quantities of reactants, water and methyl alcohol were utilized and a reaction was carried out at 110° C. for 60 minutes. With a 1.1:1 mole ratio the yield of condensation product based on the quantity of epoxides converted was 90 weight percent. With a 1.4:1 mole ratio the yield of condensation product obtained was 94 weight percent. These results show that there is some advantage in employing a molar excess of the taurine salt.

EXAMPLE VI

In order to show that other alcohols in the $C_1$–$C_4$ range can be employed in accordance with the method of this invention, a run was carried out at 80° C. for 30 minutes with the same N-methyltaurine and $C_{15}$–$C_{17}$ 1,2-epoxyalkane mixture utilized in Examples I to V inclusive with water and ethyl alcohol as the solvents. The amount of N-methyltaurine sodium salt and epoxide mixture was 37 weight percent, the amount of water was 28.6 weight percent and the amount of ethyl alcohol was 34.4 weight percent. This proportion of reactants, water and ethyl alcohol gave a single phase system at 80° C. and the yield of condensation product was 86.2 weight percent based on epoxide converted.

EXAMPLE VII

Another run was carried out using the same N-methyltaurine and $C_{15}$–$C_{17}$ 1,2-epoxyalkane mixture as in the previous examples together with water and isopropyl alcohol. The amount of epoxide-taurine mixture was 33.1 weight percent, the water 25.7 weight percent and the isopropyl alcohol 41.2 weight percent. This mixture gave a single phase at the reaction temperature of 110° C. A reaction time of 60 minutes was used. A yield of 91 weight percent based on epoxide converted was obtained.

Similar results are obtained with t-butyl alcohol, ethylene glycol and propylene glycol showing that the $C_1$–$C_4$ alcohols can be used as solvents together with water to give a single phase system thus permitting maximization of the condensation product yield.

As many possible embodiments can be made of this invention without departing from the broad scope thereof, it is to be understood that all matter herein set forth is to be interpreted as illustrative and not as unduly limiting the invention.

We claim:

1. In the method of producing epoxide-taurine salt condensation products by effecting the condensation of an epoxyalkane having from 4 to 18 carbon atoms in the molecule with an alkali metal or ammonium salt of taurine in aqueous solution, the improvement which consists of obtaining high yields of said condensation products by employing in said solution the minimum amount of a $C_1$ to $C_4$ alcohol to give a single phase solution at the condensation reaction temperature.

2. The method according to claim 1 wherein the condensation reaction temperature is in the range of from about 25° C. to 200° C.

3. The method according to claim 1 wherein the condensation reaction temperature is in the range of from 70° C. to 130° C.

4. The method according to claim 1 wherein the taurine salt and epoxide are in a mole ratio in the range of from 1.1:1 to 1.7:1.

5. The method according to claim 1 wherein the alcohol is methyl alcohol.

6. The method according to claim 1 wherein the alcohol is ethyl alcohol.

7. The method according to claim 1 wherein the alcohol is propyl alcohol.

8. The method according to claim 1 wherein the alcohol is tertiary butyl alcohol.

9. The method according to claim 1 wherein the alcohol is ethylene glycol.

10. The method according to claim 1 wherein the epoxide is a mixture of $C_{15}$–$C_{17}$ 1,2-epoxyalkanes, the taurine salt is the sodium salt of N-methyltaurine, the mole ratio of N-methyltaurine sodium salt to epoxide is 1.1:1, the alcohol is methyl alcohol and the condensation reaction temperature is in the range of from 25° C. to 200° C.

References Cited

UNITED STATES PATENTS 3,084,187  4/1963  Gaertner.
3,210,410  10/1965  Gaertner.

DANIEL D. HORWITZ, Primary Examiner